United States Patent
Fein et al.

(10) Patent No.: US 6,565,608 B1
(45) Date of Patent: May 20, 2003

(54) METHOD AND SYSTEM FOR CUSTOMIZING ALERT MESSAGES

(75) Inventors: Ronald Fein, Seattle, WA (US); Ronald Stephen Giesen, Redmond, WA (US); Darrin Nobuharu Hatakeda, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/213,061

(22) Filed: Dec. 16, 1998

(51) Int. Cl.[7] ............................................. G06F 17/21
(52) U.S. Cl. ................................................. 715/501.1
(58) Field of Search ...................... 707/501.1; 345/705, 345/410, 714; 715/501.1

(56) References Cited

U.S. PATENT DOCUMENTS

| | | | | |
|---|---|---|---|---|
| 5,361,361 A | * | 11/1994 | Hickman et al. | 345/705 |
| 5,845,120 A | * | 12/1998 | Reddy et al. | 707/513 |
| 5,877,757 A | * | 3/1999 | Baldwin et al. | 345/705 |
| 5,940,614 A | * | 8/1999 | Allen et al. | 345/705 |
| 5,982,365 A | * | 11/1999 | Garcia et al. | 345/705 |
| 6,038,598 A | * | 3/2000 | Danneels | 345/738 |
| 6,088,707 A | * | 7/2000 | Bates et al. | 707/501.1 |
| 6,119,247 A | * | 9/2000 | House et al. | 345/705 |
| 6,208,338 B1 | * | 3/2001 | Fischer et al. | 345/705 |
| 6,209,006 B1 | * | 3/2001 | Medl et al. | 345/705 |
| 6,236,989 B1 | * | 5/2001 | Mandyam et al. | 707/500 |
| 6,289,370 B1 | * | 9/2001 | Panarello et al. | 345/706 |
| 6,339,436 B1 | * | 1/2002 | Amro et al. | 345/705 |

OTHER PUBLICATIONS

Sawicki, Ed. :The LAN Audit Trail: Tools for the LAN Administrator. PC Tech. Journal, vol. 6, No. 2, pp. 126(8)(reprinted), Feb. 1998.*

Rupley, S. "To Whom It May Concern: Help!" PC Magazine, vol. 14, No. 2, p. 32(reprinted), Jan. 1995.*

Fisher, S. "IBM Intros Problem–Mgm't Bridge." Communicationsweek, No. 411, p. 4(reprinted), Jul. 1992.*

Wilson, M. "A Fast and Intuitive Online Help System." Hewlwtt–Packard Journal, vol. 25, No. 2, pp. 79(11)(reprinted), Apr. 1994.*

Faison, T. "The New HTML Help System Extends Online Help from the Desktop." Microsoft Systems Journal, vol. 13, No. 1, pp. 55(14)(reprinted), Jan. 1998.*

Display Screen, Real Audio, Version 3.0.

* cited by examiner

*Primary Examiner*—Stephen S. Hong
(74) *Attorney, Agent, or Firm*—Merchant & Gould

(57) ABSTRACT

Providing custom content that supplements static content displayed in an alert message. In response to detecting a predetermined condition, such as an error condition, the alert message is displayed to the user of a software program module. The alert message typically presents the static content and a control object, such as a button or a hyperlink. In response to the user's selection of the control object, an external information source, typically a remote server hosting a Web page, is accessed. The external information source maintains the custom content, which can include supplemental information that is related to the detected predetermined condition.

36 Claims, 7 Drawing Sheets

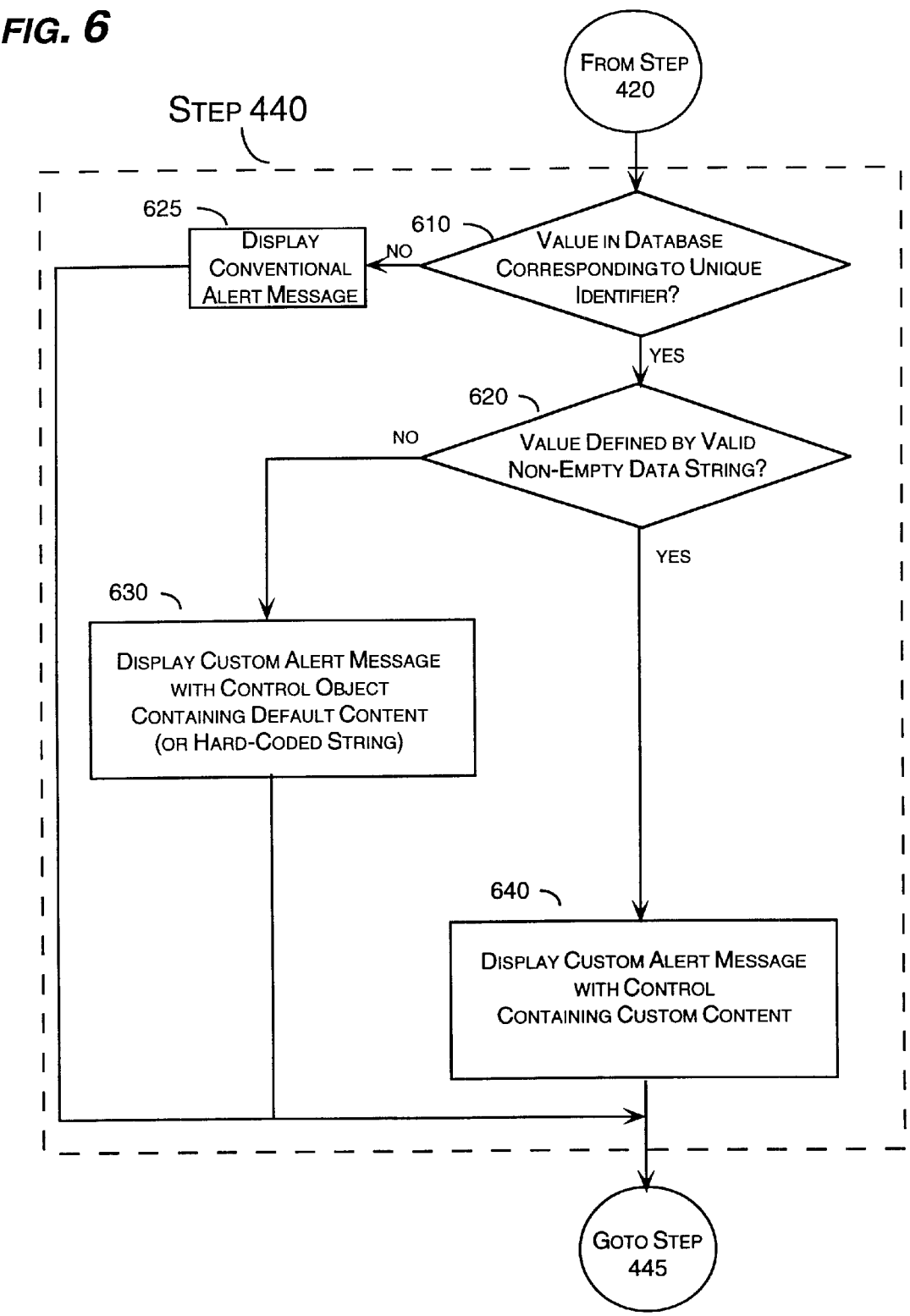

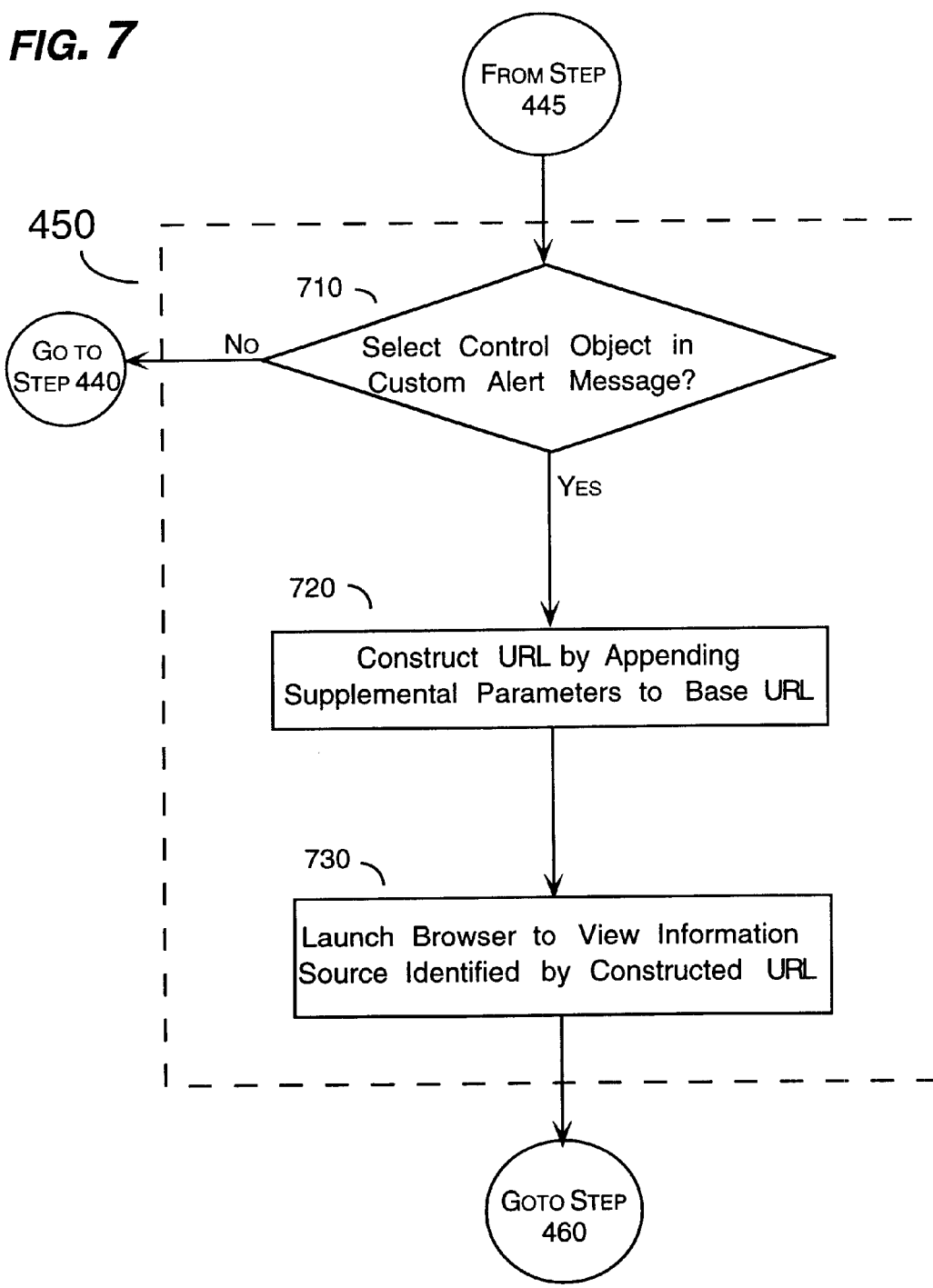

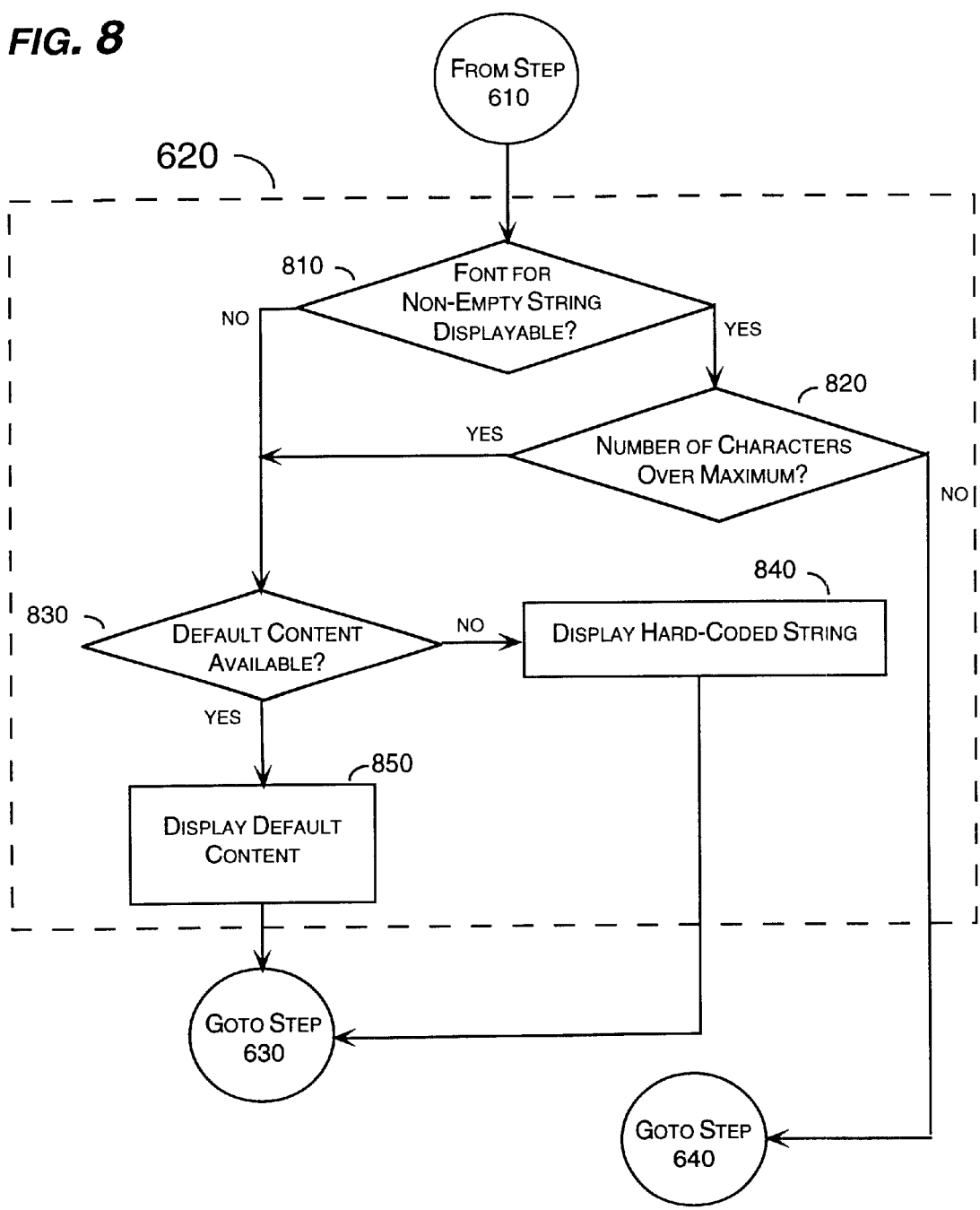

METHOD AND SYSTEM FOR CUSTOMIZING ALERT MESSAGES

TECHNICAL FIELD

The present invention generally relates to generating advisory reports in response to detecting certain conditions arising within a computing environment, and more specifically relates to generating a message with customizable content in response to detecting a particular condition arising during operation of a software program.

BACKGROUND OF THE INVENTION

Modern computer application programs, such as word processors, frequently include alert messaging systems that display dialog boxes, or windows, containing alert messages. These alert messages, or alerts, are utilized to inform the user that an error condition has been detected within the software program. Alerts are designed to assist users in resolving error conditions by conveying relevant information to the user. For example, in a typical word processor, a user trying to print a document to an unavailable printer will receive an alert in the form of an error message, such as "Cannot Print Due to a Problem with the Current Printer Setup".

Prior alert messaging systems generate alert messages containing a limited set of information intended to be useful for a user. The alert messages are typically linked to a set of predetermined events or conditions. However, the information displayed by a particular alert is not always directly linked to the underlying condition. Alert messages that are obscure, generic, or non-applicable to the particular event or condition that caused a display of the message can confuse users. Rather than presenting the user with helpful advice, these generic alerts can be counterproductive because users are often misguided by the obscure information presented by the advisory notice.

In addition, the generic alert message is statically linked into the software program. In other words, the content of the alert is defined by the software development team prior to a release of the software program, and this content can not be edited or updated without a subsequent re-release of the software product. Thus, the alert message cannot be customized to meet the developing needs of the users. For instance, an error condition giving rise to the generic alert, "Contact Your Administrator", can not be modified by the software owner to include a phone number or e-mail address of the local administrator.

Prior alert messaging systems also fail to support the tracking of incidences of advisory-related conditions or events. Nevertheless, this incident tracking information is useful to both the local system administrator and the computer application developer because this data supports a historical analysis of the conditions resulting in the generation of alerts. Only a user viewing the alert knows that an event, such as an error condition, has arisen during a program session. Thus, the local administrator and software developer cannot take steps to remedy an obvious error condition without first being notified by the user. However, notification by the user can be a time consuming and unfruitful process. For example, since a call to the local or software developer helpdesk can be costly and/or prolonged by extensive wait times, the user may not report the incident. Even where the user notifies the helpdesk, there is no guarantee the user will remember the exact alert message or the condition that resulted in the generation of the alert.

This is especially inefficient for administered computing environments, such as a large corporate organization, where multiple users utilize the same network and network devices. For instance, if thirty users on the same floor see a "Printer Not Responding" message, it is likely that the printer on that floor is down. However, the system administrator remains unaware of the situation until he is informed of the problem by one of the users. Moreover, the system administrator may receive redundant calls concerning the same error, such as multiple calls or electronic mail messages concerning an unresponsive network printer. Valuable time and resources may be wasted tracing and handling multiple incidences of the identical problem.

Similarly, the software development team for the software program remains unaware of recurrent conditions, such as inadvertent errors resulting in generation of an error message. Prior to a release of the software program, the software development may believe that an error condition rarely occurs, while, subsequent widescale use of the software program proves that the error condition may in fact occur with great frequency. Thus, certain "bugs" or defects within the software program may go uncorrected by the software developer in the absence of feedback or historical usage data from users.

One prior alert messaging system by REAL AUDIO attempts to resolve these problems by providing the user with access to supplemental information about the error condition. The system displays a standard dialog box that includes an additional button. The additional button can be selected by the user to open a Web page hosted by a central Internet site containing a generic list of all errors. Each error is accompanied by supplemental fixed information, which the user can access by searching for their specific error. A third party, such as a system administrator responsible for multiple local users of the "REAL AUDIO" software, does not control or have access to the generic information maintained at this Internet site. In other words, a local user can not control the link or the content maintained at this central information source.

While the "REAL AUDIO" alert messaging system provides additional alert information to the user, the system remains too inflexible to satisfy the other problems with existing alert systems. For example, alerts in the "REAL AUDIO" system remain statically linked to the software program, making customization impossible without the re-release of the software product. In addition, while the "REAL AUDIO" system provides some general tracking information (i. e., overall number of errors), it does not provide tracking of specific errors. Thus, system administrators remain unable to remedy a problem for a particular error condition without user notification.

In view of the foregoing, there exists a need for a customizable alert messaging system that provides specific and current information about conditions or events. This customizable alert messaging system should enable a local system administrator to efficiently track alert incidences while providing the flexibility of varying the supplemental information available to multiple users within the computing environment.

SUMMARY OF THE INVENTION

The present invention is generally directed to customizing the content of messages that are conveyed to a user within a computing environment. The present invention provides a mechanism for generating a customizable message, also referred to as an alert, in response to detecting a predetermined condition, such as an error condition or a user prompt condition, arising during operation of a software program module. For example, an alert message is typically generated as a modal dialog by an application program as a result of the occurrence of a predetermined condition. This alert serves to advise the user of the software program about the occurrence of a condition, such as an error condition, associated with an operational aspect of the computing environment.

Prior advisory message systems have generated standard alert messages, typically error condition messages within a dialog, which were statically linked to the application. These fixed messages were composed during the development of the software program and could not be modified by the user to meet particular needs. For example, a large organization that utilizes shared spreadsheet workbooks that do not handle certain features could not customize a standard error message to refer to their particular business processes. In contrast, the present invention provides an alert message having customizable content to support the presentation of information that can be directly related to the condition that caused the generation of the alert message. Communication between a user and the software program module is facilitated by displaying a customizable alert, also described as an extendable alert or notice, in response to detecting a predetermined condition.

For one aspect of the present invention, the customizable alert can be implemented by a user interface item, such as a dialog box or a balloon, containing a control object, such as a button, a hyperlink, a graphical item, or additional text. Focusing on the representative example of a modified dialog box containing an information message and one or more buttons, this type of customizable alert can enhance standard messages by providing the capability to select the button and to link to further information maintained at a separate information source. For example, the button, when selected by the user, can launch a link to an external, administerable information source, such as a Web page residing on a remote server. In addition, the button may also be customized to display useful textual information or a readily recognizable graphical item, such as an icon, to prompt the user to access this supplemental information.

By providing this additional information to the user, the present invention can support the presentation of up-to-date, locally specific information, as well as support effective tracking of selected conditions, such as error conditions. For example, a system administrator in a corporate computing environment can customize a standard alert dialog to include a hyperlink to a Web page that advises users of a problem and the approximate time to its resolution. The administrator also can track the frequency of occurrence of particular errors by noting the number of hits upon Web pages containing information regarding those conditions.

A customized alert can be generated in response to a report of the occurrence of an event or condition, which is typically generated by the underlying software program module. A unique identifier, such as an internal numerical identification or string, can be assigned to each known condition. In response to detection of a known condition, the unique identifier and standard fixed information corresponding to this condition can be located by the software program module to support the generation of an alert message.

For one aspect of the present invention, a two-prong inquiry can be conducted to determine whether the customizable alert feature of the software program module is enabled. First, a known database, such as the operating system registry, is checked for the presence of a base uniform resource locator URL. The base URL is normally fixed by the system administrator to link to a local administerable server. In the event that the base URL is present, a determination is made whether a browser function, such as Microsoft's "INTERNET EXPLORER" browser, has been installed within the user's computing environment. If the browser program is installed, the two-prong criteria are satisfied and the customizable alert feature function is enabled. Otherwise, a conventional alert message containing fixed content is generated by the software program module for presentation to the user.

In the event that both conditions have been met, the database maintained in memory, such as the application-specific portion of the registry, is examined for a value corresponding to the unique identifier. A portion of the data defined by this value can determine the custom information, if any, to be displayed by the control object, i.e., the button, of the alert message. In the event that the value does not exist in the database, the particular condition is not represented by a custom alert. Consequently, a conventional alert message containing fixed content is generated by the software program module for presentation to the user.

However, if the value exists as an entry in the database, then an alert containing at least one control object, such as a button or a hyperlink that, when enabled, provides a link to a Web page located at a remote server, will be displayed to the user. The content displayed by the face of the control object typically depends upon whether the data for the value corresponding to the unique identifier contains (1) an invalid or an empty data string or (2) a valid, non-empty data string. In response to an invalid or empty data string, a custom alert message is displayed with the control object displaying default data. In response to a valid, non-empty string, a custom alert message is displayed with the control object displaying the data defined by the non-empty data string. Thus, a system administrator may customize the control object by editing the data for the value that corresponds to a particular unique identifier.

In response to the user's selection of the control object, a URL can be constructed by appending the unique identifier onto the base URL. Subsequently, a system call initiates the local browser program to find the site of the constructed URL and to present the information published at that separate site.

The various aspects of the present invention may be more clearly understood and appreciated from a review of the following detailed description of the disclosed embodiments and by reference to the appended drawings and claims.

BRIEF DESCRIPTION OF THE DRAWINGS

FIG. 6 is a logical flow chart diagram illustrating the steps performed by a computer-implemented process for displaying a control item within a custom alert message in accordance with an exemplary embodiment of the present invention.

FIG. 7 is a logical flow chart diagram illustrating the steps performed by a computer-implemented process for displaying information associated with a custom alert message in accordance with an exemplary embodiment of the present invention.

FIG. 8 is a logical flow chart diagram illustrating the steps performed by a computer-implemented process for determining the content to be displayed by a control item within a custom alert message in accordance with an exemplary embodiment of the present invention.

DETAILED DESCRIPTION OF THE EXEMPLARY EMBODIMENTS

Figure 1:
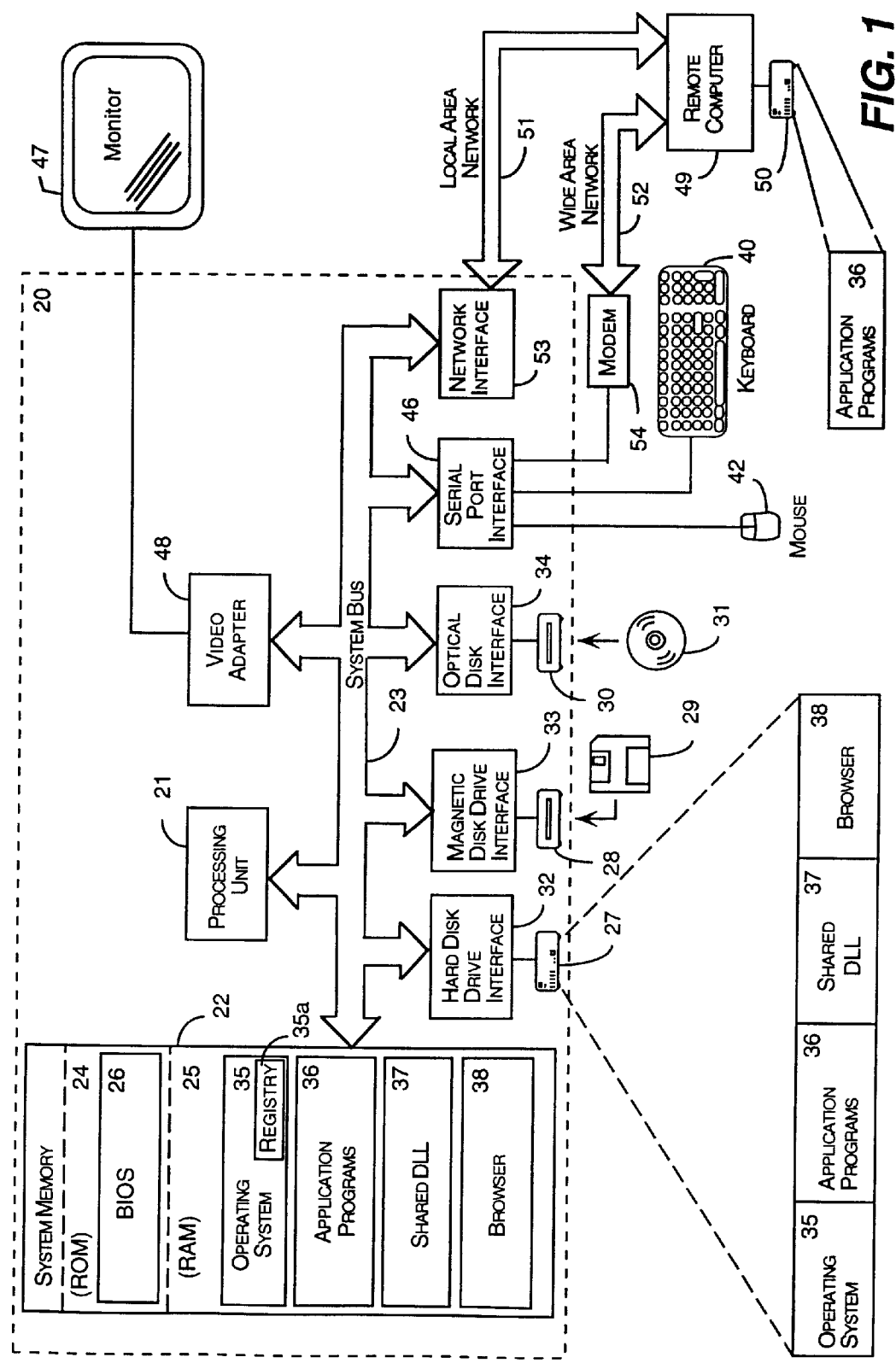
FIG. 1 is a block diagram illustrating the exemplary operating environment of the present invention.

The present invention is directed to customizable messages, which are capable of providing a link for information maintained at an administerable, potentially remote source, such as an external server connected to a distributed computer network. For example, alert messages, also described as extendable alerts, can be generated in response to detecting a predetermined condition arising during operation of a software program module. An alert message typically contains static information relating to the underlying condition that caused the generation of the alert message. In addition, this alert message can include a control object, such as a button or a hyperlink, which, once selected, opens a link to additional information maintained at a separate information source. Specifically, the selection of this control item by the user can open a link to a Web page hosted by a source other than the local computer executing the software program module. This Web page can display additional information, including customized information, for the benefit of the user.

For example, a system administrator for a large corporate computing environment can add to a Web page hosted by a central information site specific information relating to an error condition. In response to a subsequent detection of this error condition by a user operating a machine in the corporate computing environment, an alert containing fixed text-based information and a control object is presented to the user, typically in the form of a dialog box. In response to user selection of the control object, a link is opened to the Web page, thereby presenting the user with specific information regarding the error condition. The selection of the control object can also trigger server-side code maintained at the site identified by the link. This allows the system administrator to track the frequency of occurrence for that particular error condition based on a historical record of the number of times that this Web page is accessed over a time period. The control object can contain customized information, such as text or a graphical object, for prompting the user to select the control item and to access the additional information available at this separate information site.

Advantageously, the present invention enables system administrators to respond to an alert condition, such as a program error, by adding specific information for this alert condition to an information source available to multiple users when these users encounter the error condition and the resulting customized alert message. This allows system administrators to provide issue resolution information for selected conditions arising from execution of a program module on multiple computer systems, while reducing redundant support telephone calls to a help desk maintained by the system administrator. Consequently, system administrators can utilize the present invention to provide corporate-specific information to further explain issues arising from the detection of an alert condition.

For a representative example, Jane Corporate, the system administrator at Acme Corporation, notices that four users have received an alert regarding the non-operation of the "Corporate 1" file server. This alert indicates that a user does not have access to the file server. In response, Jane verifies that the "Corporate 1" file server has crashed and is no longer operational. Consequently, Jane creates a Web page hosted by an internal corporate server to present the message "Corporate 1 server is down and will be operational by 3:30 p.m." Joe Corporate subsequently attempts to open his monthly status report, which is maintained on the "Corporate 1" server. In response to an attempt to open this document, the word processor program generates an alert message advising that the document cannot be opened at that location. This alert message also contains a button labeled "Acme Help Desk". In response to selecting this button, an Internet browser is opened on Joe's machine and a link is opened to the Web page advising "Corporate 1 server is down and will be operational by 3:30 p.m." In response to this additional information, Joe elects to turn to another productive task rather than call the help desk to inquire about the status of the "Corporate 1" server.

As illustrated by this representative example, the present invention supports the presentation of alert messages containing userselectable link(s) to information maintained by a separate information source, in response to the detection of corresponding events or conditions. The alert message typically contains text-based information and at least one control object for prompting the user to review additional information preferably maintained by a source other than the local machine. This additional information, which can be viewed as customized information defined by an operator or administrator of the local machine, also can be stored by a source that is local to the computer, such as a hard-disk drive. In response to a user event, such as the selection of the control object, a link to the additional information is opened to present this information to the user. Because this information is maintained at a separate source, the information can be adapted to relate directly to the underlying event or condition that caused the generation of the alert message.

Referring now to the drawings, in which like numerals represent like elements throughout the several figures, aspects of the present invention and an exemplary operating environment will be described.

FIG. 1 and the following discussion are intended to provide a brief, general description of a suitable computing environment in which the invention may be implemented. While the invention will be described in the general context of an application program that runs under an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including a processing unit 21, a system memory 22, and a system bus 23 that couples the system memory 22 to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35 (e.g., Microsoft Corporation's "WINDOWS 95", "WINDOWS 98" or "WINDOWS NT" operating systems), one or more application programs 36, a shared dynamic linked library 37, and a browser 38, such as Microsoft's "INTERNET EXPLORER" browser program. It will be appreciated that the functionality of the browser program can be incorporated as part of an operating system or within a separate program module. The operating system 35 typically includes a registry 35a, which is typically implemented as a database containing entries regarding the hardware and software components of the computing environment for the personal computer 20. The shared dynamic linked library 37, often referred to as a DLL, can be accessed by one or more of the application programs 36.

A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
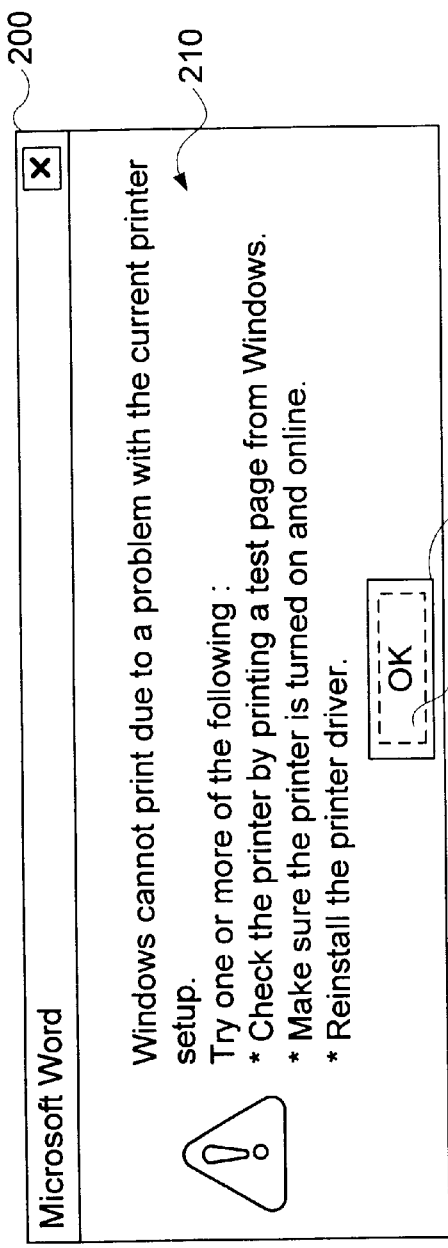
FIG. 2 is an illustration of a conventional alert message generated by a software program in response to detection of a predetermined condition.

FIG. 2 illustrates a conventional alert message comprising a dialog containing information generally directed to an event or condition detected by a software program module. Referring to FIG. 2, a dialog 200 is generated by the Microsoft "Word 97" application program in response to detecting a problem with the current printer setup. The dialog 200 contains static content 210 and a control object shown as button 220. The content 210 is presented within the central portion of the dialog 200 and advises that "Windows cannot print due to a problem with the current printer setup." The content 210 also encourages the user to Try one or more of the following:
Check the printer by printing a test page from Windows.
Make sure the printer is turned on and online.
Reinstall the printer driver.

The button 220 typically includes content 230, in this case, the term "OK" on the face of the button. The dialog 200 is generated by the application program in response to detecting a condition associated with a problem with the current printer setup. In response to the user's selection of the button 220, the dialog 200 is closed and removed from the display screen.

As shown in FIG. 2, the dialog 200 represents a conventional alert message containing static information relating to an event or condition detected by a software program module, in this case, Microsoft's "WORD 97" application program. The user has a single responsive option, namely selecting the "OK" button 220 to acknowledge the alert message and to close the dialog 200. The content 210 is representative of alert-related information that is defined by a software developer prior to release of a software program. The information is hard-coded as an entry within a table maintained by the application program, and cannot be modified by a third party. Consequently, the content 210 cannot be edited or updated without a subsequent re-release of the software program, and cannot be readily modified by a party other than the manufacturer. Thus, the dialog 200 presents alert-related information that cannot be customized to satisfy the particular needs of a set of users, such as users within a corporate environment, in view of the fixed generic nature of the content 210.

Figure 3:
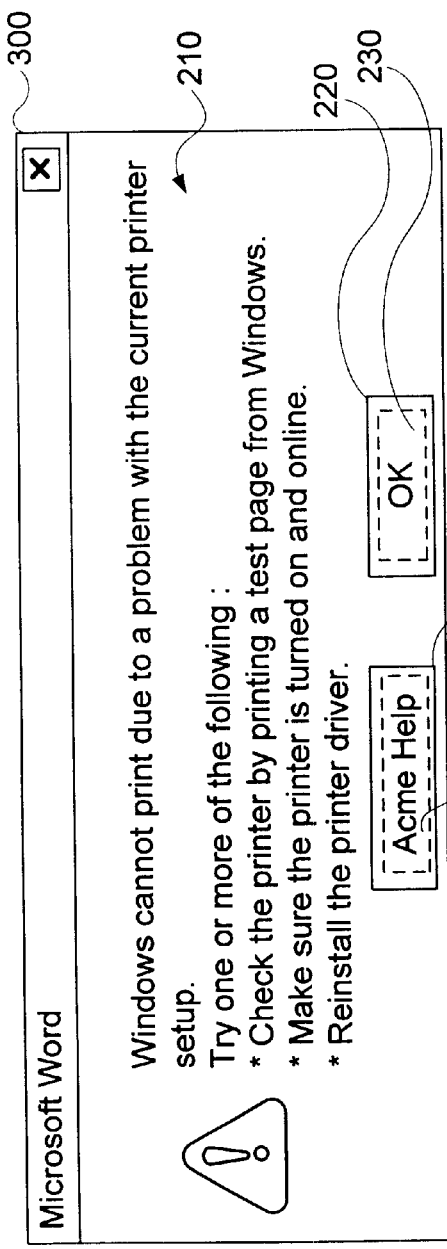
FIG. 3 is a diagram of a custom alert message generated by a software program in response to detection of a predetermined condition in accordance with another exemplary embodiment of the present invention.

FIG. 3 is an illustration of another alert message that supports the presentation of customizable content in accordance with another exemplary embodiment of the present invention. Turning to FIG. 3, a dialog 300 contains static content 210 and a pair of buttons, the button 220 and a button 310. As described above with respect to FIG. 2, the button 220 includes the term "OK" as the button content 230, thereby prompting the selection of this button if the user desires to acknowledge the static information of the content 210 and to close the dialog 300. The button 310 also contains a label, as shown by button content 320 including the term "Acme Help". In this case, the button content 320 advises that operation of the button 310 will enable the user to access information at a separate source, the "Acme Help" desk 14 operated by a separate corporate server. The user's selection of the button 310 launches a link to another source of information, which is typically related to the event or condition that caused the generation of the alert message. Although the button content 320 is represented by a text-based label, "Acme Help", it will be appreciated that the button content 320 can include other textual information or one or more graphical items, such as an icon. The appearance of the button content 320 can be adapted to be consistent with the content of the additional information maintained at the information source or to identify the location or nature of this source.

Significantly, the user's selection of the button 310 results in the presentation of additional information to the user based on a link, typically implemented by a hyperlink, to another information source. Because this information is preferably maintained at a separate source, it can be adjusted in a dynamic fashion to present up-to-date, locally specific information, such as information regarding a particular condition detected by the software program module running on a user's machine. In addition, access to this information source can be monitored to support tracking of the occurrence of one or more conditions corresponding to the information presented by this source. In view of the foregoing, it will be appreciated that the dialog 300 can provide an alert message having customizable content that supports the presentation of supplemental information that can be directly related to the condition that caused the generation of this alert message.

In contrast to the dialog 200 shown in FIG. 2, the dialog 300 also includes a control object, namely the button 310. The control object, also described as an interactive user interface element, is typically implemented by a modal control. For an exemplary embodiment, a modal control selected by the user results in a link to a source of additional information, which is typically directed to the event or condition that caused the generation of the original advisory message. A button, such as the button 310, is a representative example of this type of modal control. Other representative examples of modal controls for use in connection with alternative embodiments of the present invention include hyperlinks, radio buttons, check boxes, spin controls, list boxes, edit boxes, and other controls typically used in combination with dialogs or balloons where the viewer can enter or select data. This use of a modal control within the dialog gives the user an option to access additional information from another source. The customized delivery of supplemental information provides the user with flexibility regarding his or her response to this modal custom alert message.

Although FIG. 3 illustrates conventional buttons for the modal controls of the custom alert messages, those skilled in the art will appreciate that some applications may use a more conversational, "friendly" labeled button in place of the standard gray rectangular button used in a "WINDOWS"-compatible computing environment. For example, a button can include a label "Click here to go to <insert description for the external information source>." Alternatively, a button control within the dialog of a custom alert message can be replaced with a hyperlink that serves as a link to the external information source. Other embodiments of the custom alert message can include multiple modal control objects for obtaining access to one or more sources of supplemental information.

Although the dialog 300 uses an interactive user interface element, such as the button 310, to enable a user to obtain information that supplements the content offered by the dialog 300, those skilled in the art will appreciate that this interactive user interface element can be responsive to other types of user input, including voice input. For example, a user could respond to the presentation of a dialog, such as the dialog 300, by speaking the command "Please access the Acme Help Desk." In response to this speech-driven command, a link can be opened to another information source to supplement or revise the information presented by the present dialog. Consequently, the present invention also encompasses other forms of interactive user interface elements, including those responsive to speech-driven commands.

Although the dialog 300 typically contains static content 210 that is defined by the manufacturer of the underlying software program, an alternative embodiment can include a mechanism which, when enabled, prevents the presentation of this static content to the user. In this manner, a system administrator responsible for operation of the program module on the computing machines of multiple users can effectively disable the presentation of static content defined by the software manufacturer. This allows the system administrator to have complete control over the information presented to the user by the dialog 300.

Figure 4:
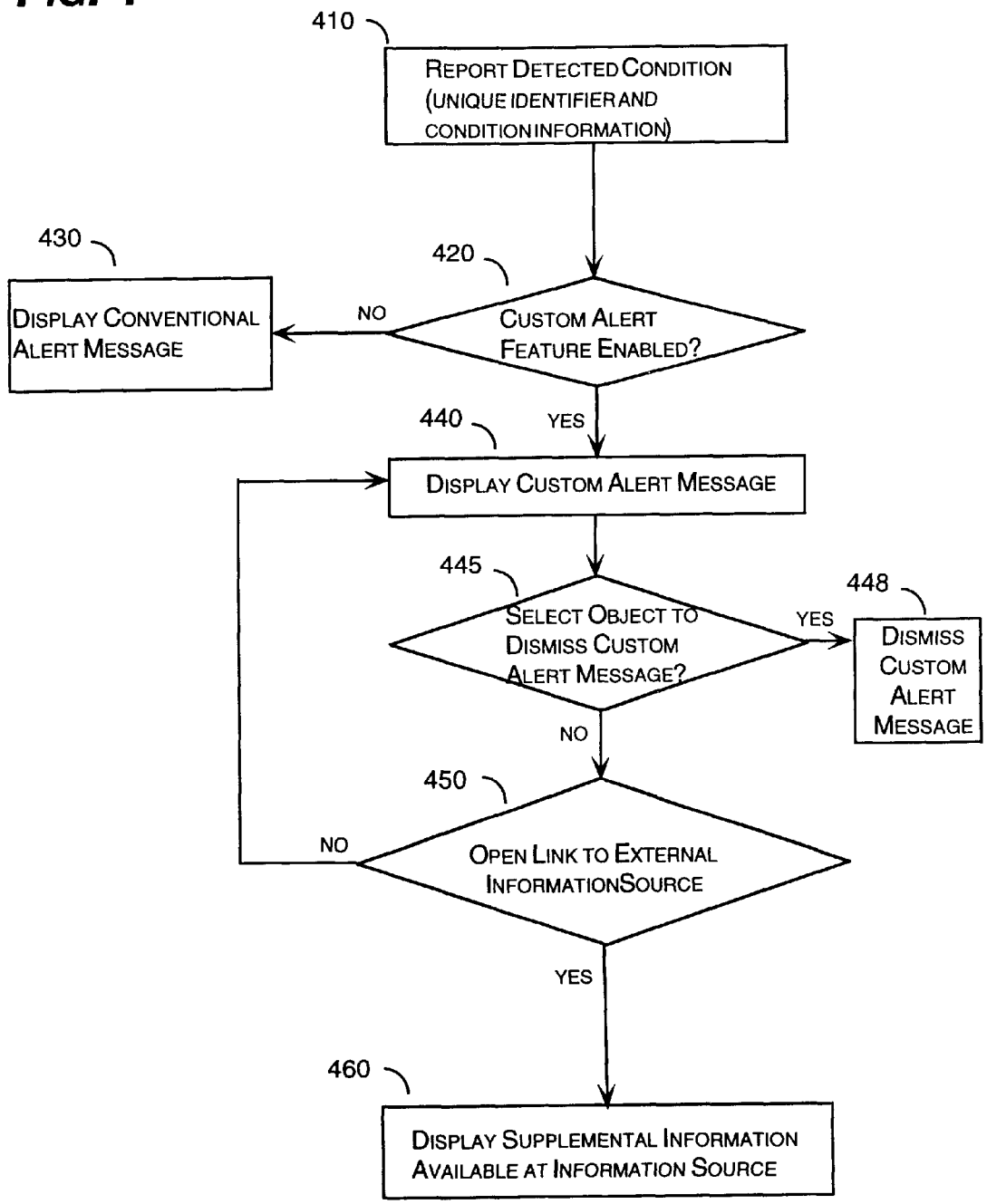
FIG. 4 is a logical flow chart diagram illustrating the steps performed by a computer-implemented process for generating a custom alert message in accordance with an exemplary embodiment of the present invention.

FIG. 4 is a logical flowchart diagram illustrating a computer-implemented process for generating a customizable alert message in response to detection of an event or condition, such as an error condition associated with a software program module. Although the exemplary computer-implemented process illustrated in FIG. 4 is directed to an alert message associated with detection of an error condition, it will be appreciated that the present invention can be extended to other types of events and conditions. Moreover, the information presented by the alert message, as well as the information presented in response to linking to another information source, can include content not associated with a particular event or condition. For example, the alert message can include a reminder to back-up the user's electronic mail file, thereby presenting a helpful tip rather than a report of an error condition. For the electronic mail back-up example, the link to a supplemental information source could include a link to a Web page describing a company's facility for archiving data. Consequently, the present invention is not limited to the specific embodiment described herein, namely the generation of an extendable alert message associated with detection of an error condition.

Turning now to FIG. 4, a computer-implemented process 400 is initiated in step 410. For example, a report of an error condition is typically generated by a software program module, running on the user's local machine, in response to detecting the error condition. In response to detection of an error condition, a unique identifier and fixed information corresponding to this condition are located to support the eventual generation of an alert message. The unique identifier and the fixed information can be stored as an entry in a table, array, database, or any other conventional data storage mechanism. In response to detecting an error condition, the software program module can call a shared dynamic linked library, such as the DLL 37 (FIG. 1), and passes the unique identifier for the corresponding error condition (and any supplemental information, such as static content) to the shared dynamic linked library. In an alternative embodiment, the software program module can call another software program or can jump to another code segment to pass the unique identifier for the corresponding error condition or supplemental information.

In response to the error condition report, an inquiry is conducted by the shared dynamic linked library in step 420 to determine whether an extended alert feature, also described as a customized alert feature, is enabled for the software program module. If the response to this inquiry is negative, the "NO" branch is followed to step 430 and a conventional alert message is displayed to the user. In step 430, the conventional alert message is displayed based upon the fixed information located in step 410. This conventional alert message contains static content, such as text-based information that is fixed by a software development team prior to release of the software program to the consuming public. In addition, this conventional alert message typically includes a control item, such as a button, to allow the user to actively acknowledge the alert message, which typically results in closing the dialog presenting the alert message. A representative example of this conventional alert message is shown in FIG. 2.

In the event that the inquiry conducted in step 420 results in a positive response, the "YES" branch is followed to step 440. In step 440, a custom alert message is presented for viewing by the user. The shared dynamic linked library preferably controls this display of the custom alert message. A representative example of this customized alert message is shown in FIG. 3. The customized alert message typically includes static content, such as information directed to the detected error condition, and one or more control objects, such as a button or a hyperlink. At least one control object, when enabled by a user action, supports access to additional information maintained by a source other than the local computer operating the software program module. This access to another information source is typically implemented by a hyperlink containing a uniform resource locator (URL) that identifies this additional information source. The information source is often maintained as a remote server that is physically separated from the local machine of the user.

In step 445, an inquiry is conducted to determine whether an object operable to dismiss the custom alert message has been selected by the user. If so, the "YES" branch is followed to step 448 and the custom alert message is dismissed. Otherwise, the "NO" branch is followed from step 445 to step 450.

In step 450, an inquiry is conducted by the shared dynamic linked library to determine whether a link is opened to access additional information maintained by another source. The content of this additional information is typically directed to specific material for a detected error condition and can be easily adapted or customized to apply to the issue at hand. This link can be opened in response to a user selecting the appropriate control presented by the customizable alert message. If the user elects to not access this information, the "NO" branch is followed from step 450 to step 440 and the alert message remains displayed to the user. If the response to the inquiry conducted in step 450 is positive, the "YES" branch is followed to step 460. By opening a link to another information source in step 450, additional information can be displayed to the user in step 460. For example, a browser can be launched in response to enabling a control object presented by the custom alert message and, in response, the supplemental information can be viewed by opening a hyperlink associated with that control. For a representative embodiment, the custom alert message can remain on the display screen until the user dismisses the dialog, typically by the selection of a control to dismiss this user interface item. Alternatively, for another embodiment, the custom alert message can be dismissed in response to presenting supplemental information to the user.

Figure 5:
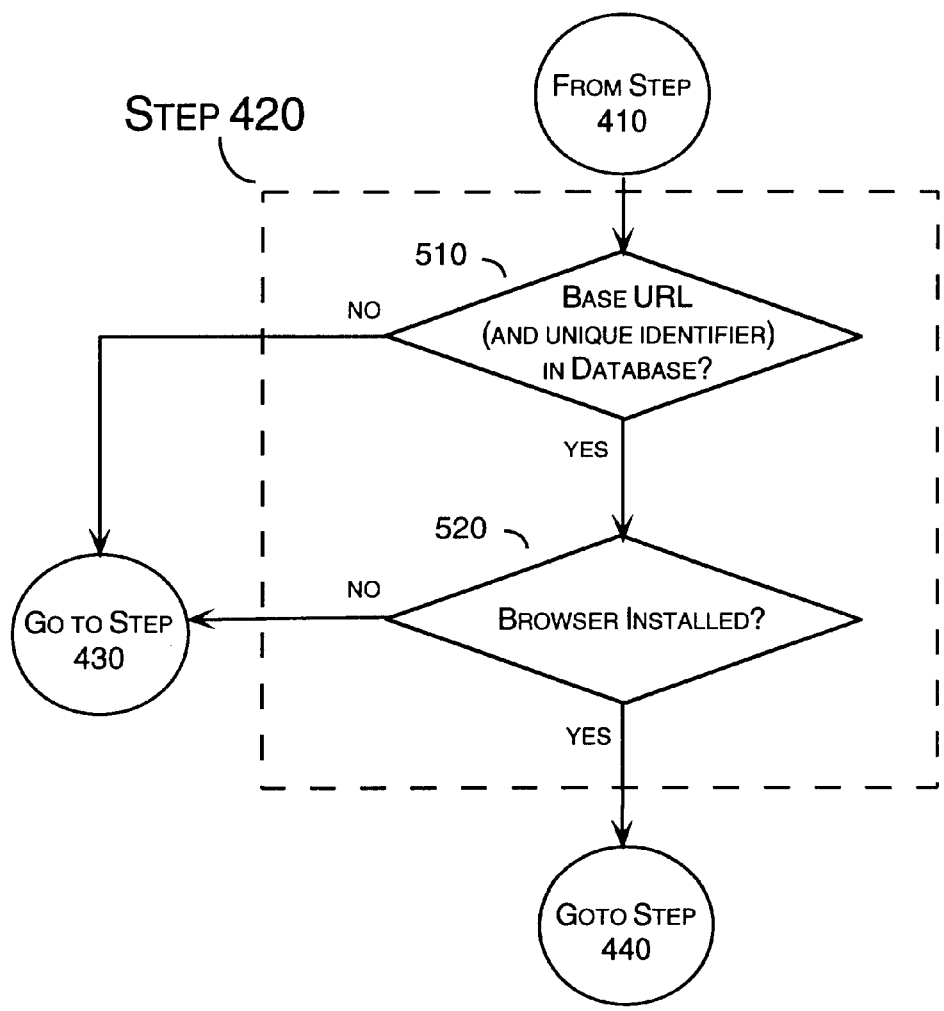
FIG. 5 is a logical flow chart diagram illustrating the steps performed by a computer-implemented process for determining whether a custom alert message feature is enabled in accordance with an exemplary embodiment of the present invention.

FIG. 5 is a logical flowchart diagram illustrating the computer-implemented process for determining whether a customizable alert message feature is enabled for a software program module. Specifically, FIG. 5 provides a detailed overview of the tasks completed within step 420 of FIG. 4. Turning now to FIGS. 4 and 5, the process is entered from step 410 and proceeds to decision block 510. An inquiry can be conducted by the shared dynamic linked library at step 510 to determine whether a base parameter, such as a base uniform resource locator (URL), is maintained in a database accessible by the software program module. For this exemplary embodiment, a single predetermined location in the registry of the operating system, such as the registry 35*a* (FIG. 1), is searched to determine whether the base URL is maintained within a known location of the registry. This base value for the URL can be defined by a system administrator after the vendor's release of the software program module to support a link to additional information associated with the detected condition and maintained by another source, such as a corporate server site administered by the system administrator. In the event that a base value for the URL is not located in this database, the "NO" branch is followed and the process proceeds to step 430 of FIG. 4. However, if the base value for the URL is available in the database, the "YES" branch is followed to step 520.

In step 520, an inquiry is conducted by the shared dynamic linked library to determine whether a browser program, such as the browser 38 (FIG. 1), is installed and available for use by the user. This browser program can be installed on either the user's machine or available to the user by accessing a remote server. If the browser function is not installed for operation, the "NO" branch is followed to step 430 of FIG. 4. Otherwise, the "YES" branch is followed to step 440 for displaying the customized alert message.

FIG. 5 illustrates a two-pronged approach for determining whether the customizable alert message feature of the software program module is enabled for operation. In particular, this two-pronged approach relies upon (1) an inquiry to determine whether a base parameter is maintained in the registry of the operating system and (2) an inquiry to determine whether a browser is installed for operation in connection with the software program module to access information maintained at a separate information source. To minimize computing operations, the results of these inquiries can be cached within local memory during a user's session of the software program module to avoid repeating these inquiries during that session. Consequently, there is no need to repeat steps 510 and 520 during a single session of the software program module because the results of these initial inquiries are maintained in memory. Instead, the results can be read from memory to support subsequent inquiries during the program session. The results of these initial inquiries can be deleted or overwritten in response to starting a new session of the software program module.

FIG. 6 is a logical flowchart diagram illustrating the steps completed by a computer-implemented process for displaying a customized alert message in accordance with an exemplary embodiment of the present invention. Specifically, FIG. 6 illustrates the tasks completed in step 440 of FIG. 4 to support a display of the customized alert message, which is typically presented as a dialog containing at least one control object that supports a link to additional information maintained at a separate source. Entering the process from step 420 of FIG. 4, an inquiry is conducted in step 610 to determine if a value is maintained in the database that corresponds to the unique identifier for the detected condition. If the unique identifier is found within the registry the "YES" branch is followed to step 620. If the unique identifier is not found then the "NO" branch is followed to step 625, where a conventional alert message is displayed with no additional controls. From step 625, the process exits to step 445 of FIG. 4.

The inquiry of step 610 can be completed by examining entries within the registry of the operating system to determine whether a value corresponds to this unique identifier. This search is typically conducted within the portion of the registry that is allocated to data regarding the software program module. At least a portion of the data for this value, if available, will define the custom information to be displayed by a control object of the customized alert message.

In step 620, an inquiry is conducted to determine whether the value corresponding to the unique identifier is set to a valid, nonempty data string. If the data string is set to a null value, the "NO" branch is followed to step 630. In step 630, the customized alert message is displayed with a control object having a face displaying default content. For example, default text can be displayed by the face of a button that implements this control object. Because of the default nature of this content, this information is typically presented as the content for each button of a customizable alert message in which the value corresponding to the unique identifier for the detected condition is set to a null value. Custom content typically corresponds to a particular error condition, or event.

In the event that the value responding to the unique identifier is set to a valid, non-empty data string, the "YES" branch is followed from step 620 to step 640. In step 640, a customizable alert message is displayed with a control object containing content defined by the non-empty data string. In other words, this user control object, which is typically implemented by a button, can contain customized text or one or graphical objects defined by the non-empty data string. The routine is then exited by proceeding to step 445 of FIG. 4 from either step 625, 630 or step 640.

The default content can be set by a system administrator to identify a common administrative function, such as a help desk, available to computer users within a corporate computing environment. The default content does not necessarily correspond to a particular error condition detected by the software program module. In contrast, the non-empty data string, which is typically defined by a system administrator, is set to a value in the registry that defines content corresponding to a particular condition. For a representative embodiment, a hard-coded string can be displayed in the event that default content is not otherwise available for presentation by the customized alert message.

FIG. 7 is a logical flowchart diagram illustrating a computer-implemented process for accessing the information source that maintains custom information in a storage location other than the user's machine. Specifically, FIG. 7 illustrates the tasks completed during step 450 of FIG. 4. Entering from step 445, the user can select the control object, typically implemented by a modal control such as a button or a hyperlink, which is displayed as a portion of the customizable alert message. In response to a selection of this control item, the "YES" branch is followed to step 720. Otherwise, the "NO" branch is followed from step 710 to return to step 440 (FIG. 4). The selection of this control object in the customizable alert message will support the opening of a link to additional information available at the separate information source.

In step 720, a URL for the information source is constructed by appending one or more supplemental parameters to the base URL maintained in the registry (see step 510 of FIG. 5). An exemplary example of a base URL, stored in a single known registry location, is "http://trioweb/extalerts/office/9/default.asp?" Representative examples of supplemental parameters include an identifier for the underlying software program module, such as the component identifier, the unique identifier for the condition detected by the software program module, the user's Help language identifier, and the User Interface Language identifier. It will be appreciated that the system administrator can define values for a supplemental parameter after the release of the software program module to the consuming public. In other words, the system administrator can change the supplemental parameters to identify an information source hosted by a server site controlled by that system administrator.

In step 730, the browser is launched to view the additional information available at the information source identified by the constructed URL. The browser is typically launched by the shared dynamic linked library making a conventional call to the browser program. Alternatively, the browser can be launched by the software program module itself or a related program called by the software program module. The dynamic linked library then passes the constructed URL to the browser, typically in the form of a data string. For an Intranet or Internet environment, this allows a user to view a Web page containing additional information maintained at a separate information source site. This information is typically associated with the detected error condition and supplements the fixed information provided by the dialog of the customizable alert message. This routine is exited by proceeding from step 730 to step 460 of FIG. 4.

FIG. 8 is a logical flowchart diagram illustrating the steps of a computer-implemented process for determining whether to display the customized alert message with a control object containing default content or customized content. Specifically, FIG. 8 illustrates the tasks completed by step 620 of FIG. 6. Entering from step 610 of FIG. 6, an inquiry is conducted at step 810 to determine whether the font for rendering the non-empty data string for the value corresponding to the unique identifier can be displayed by the software program module. This inquiry is conducted because certain fonts may not be available to support the presentation of content for the control object displayed by the customizable alert message. If the font is available, the "YES" branch is followed from step 810 to step 820.

An inquiry is conducted at step 820 to determine whether the number of characters defined by the non-empty data string exceeds a maximum limit for the content to be displayed on the face of the control object for the customizable alert message. It will appreciated that a control object, such as a button, has a defined space within the customizable alert message, and that this defined space can accommodate the presentation of a finite number of characters. Consequently, the inquiry conducted in step 820 supports a determination of whether the non-empty data string can be displayed within the space available for the control object of the customizable alert message. If the number of characters of the non-empty data string does not exceed the maximum number, then the "NO" branch is followed from step 820 and the routine proceeds to step 640 (FIG. 6) to support the display of the customize alert message with a control object presenting content defined by the non-empty data string.

If the number of characters for the non-empty data string exceeds the maximum number limit, the "YES" branch is followed to step 830. Likewise, if the font for the non-empty data string is not available, the "NO" branch is followed from step 810 to step 830. An inquiry is conducted in step 830 to determine whether default content is available for presentation as the content of the control object for the customizable alert message. If so, the "YES" branch is followed to step 850 to display default content. The routine then exits to step 630 (FIG. 6). Otherwise, the "NO" branch is followed from step 830 to step 840. In step 840, a hard-coded data string that is independent of any default content value defines the content for the control object. The customizable alert message includes a control object having content defined by this hard-coded string in response to completing step 840. The routine is then exited to step 630 of FIG. 6.

For a representative embodiment, default content identified by the inquiry conducted in step 830 can be further analyzed prior to proceeding to step 630. For example, if the selected font cannot render the default content, a hard-coded string can be substituted as the default content. Likewise, if the number of characters for the default content exceeds a maximum threshold, then a hard-coded string can be presented in place of the default content. In this manner, the tasks associated with steps 810 and 820 are completed on the default content identified by the inquiry of step 830 prior to proceeding to step 630.

Because supplemental information is maintained by an information source that is separate from the local users machine, another party, such as a system administrator, can track the number of times that this information source is accessed by users within the computing environment. For example, in response to selecting the custom button on the customizable alert message, a hyperlink can be opened to a Web page containing additional information regarding a detected error condition. This Web page is hosted by an information source, such as a remote server, maintained by the system administrator. The system administrator has complete control over both the content displayed within the custom control button of the customizable alert message and the information maintained by the information source and accessible via a hyperlink activated in response to selection of the custom button. Tracking the number of times that this information source is accessed can support a historical analysis of the occurrences of this error condition within the computing environment. This allows the system administrator to determine the scope of a particular error condition and the problem associated with that error condition for the users within the computing environment.

Significantly, this mechanism allows a system administrator an opportunity to obtain specific information about a particular error from a single user or multiple users within the computing environment. The user's selection of a button within the custom alert message can (1) lead to the opening of a hyperlink to a separate information source and (2) supplies information to both the user and to the system administrator responsible for the information source. The user can gain access to additional information maintained at the separate information source, whereas the system administrator can learn more about the user's operations by tracking his or her access to this information source. In this manner, the system administrator can track a particular error condition without relying upon a user to manually report the particular error faced by that user. The opening of a link to this information source can also support an automated response to address the detected condition associated with an access of this information source. This automated response can include a solution to an error condition detected by the software program module.

For the exemplary embodiment, the system administrator can gain information regarding the occurrence of a particular error condition faced by a user only if that user selects a designated button of the customizable alert message. An alternative embodiment can address this potential problem by providing the system administrator with an automated alert in response to the software program module detecting an error condition. For example, an advisory signal can be automatically transmitted to the system administrator from the user's machine via a distributed computer network in response to detection of a particular condition by the software program module. Alternatively, the advisory signal can be implemented as a page transmitted by a radiopaging device or by other conventional transmission mechanisms.

This advisory signal function is preferably separate from the alert message presented to the user in response to the detected condition. For example, the user can remain unaware that this advisory signal has been transmitted to the system administrator, thereby removing a user's control over this advisory function. The system administrator, however, can be automatically contacted to advise of a potential problem associated with the detected condition. The typical function of the advisory signal is to advise a third party, such as the system administrator, that a particular condition of the software program module has been detected, such as an error condition. Alternatively, the advisory signal can be used to send information about the underlying program module, the operating system running on the computer, or the computer and its peripheral devices. Consequently, it will be understood that the information carried by the advisory signal is not necessarily limited to information regarding a detected condition of the program module, but can be extended to other types of status-related information.

The inventive aspects of the present invention can be extended to alternative embodiments for the customizable alert message. For example, the customizable alert message can contain more than one control object, such as multiple buttons or hyperlinks, to provide the user with options for accessing additional sources of information when presented with the alert message. In addition, an alternative customizable alert message can include custom content that supplements the standard content for an alert message. For this exemplary embodiment, the "custom" information is presented within the framework of the alert message itself rather than relying solely upon a user's selection of a control item to link to information available at a separate source. This custom information can be maintained in a database maintained on a local machine or as a file, stored on a remote server and accessible via a computer network. Similar to the custom information accessed via a link to an external information source, this custom information can be manipulated by a third party, such as a system administrator. Those skilled in the art will recognize that the inventive aspects of the present invention can be extended in other ways that remain within the scope of the subject matter described by this application.

The invention may conveniently be implemented in one or more program modules that are based upon and implement the features illustrated in the logical flowchart diagrams of FIGS. 4–8. No particular programming language has been described for carrying out the various procedures described above because it is considered that the operations, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the appended claims rather than the foregoing description defines the scope of the present invention.

What is claimed is:

1. A computer-implemented method for providing information regarding one of a plurality of predetermined conditions associated with operation of a program module on a computer, comprising the steps of:

detecting one of the predetermined conditions;

accessing an information source that maintains custom content in response to detecting one of the predetermined conditions, the custom content representing information defined by a party other than the manufacturer of the program module; and presenting the custom content.

2. The computer-implemented method of claim 1 further comprising the step of displaying an alert message in response to detecting one of the predetermined conditions and prior to accessing the information source, the alert message comprising static content defined by the manufacturer of the program module.

3. The computer-implemented method of claim 2, wherein the alert message further comprises at least one control object, and wherein the step of accessing an information source comprises selecting one of the control objects of the alert message and linking to the information source to access the custom content.

4. The computer-implemented method of claim 3, wherein the custom content is associated with the detected predetermined condition.

5. The computer-implemented method of claim 3, wherein the information source comprises an external information source operating in a location separate from the computer.

6. The computer-implemented method of claim 3 further comprising the step of determining whether to display the alert message with at least one control object operable to link to the information source by inquiring whether the custom content associated with the detected predetermined condition is maintained at the information source.

7. The computer-implemented method of claim 3 wherein the step of accessing the information source comprises the steps of:

launching a browser in response to selecting one of the control objects of the alert message; and using the browser to access the custom content maintained at the information source by opening a hyperlink to the information source.

8. The computer-implemented method of claim 1, wherein the party is a system administrator responsible for supporting the computer.

9. The computer-implemented method of claim 8, further comprising the step of notifying the system administrator about the detected predetermined condition.

10. The computer-implemented method of claim 1, wherein the custom content is maintained in a database residing on the computer and accessible for modification.

11. The computer-implemented method of claim 1 further comprising the step of sending an advisory signal to a data collection site operating in a location separate from the computer in response to detecting one of the predetermined conditions.

12. The computer-implemented method of claim 11, wherein the advisory signal is operative to report the occurrence of the detected predetermined condition at the computer.

13. The computer-implemented method of claim 11, wherein the advisory signal is operative to report information about the state of the program module.

14. The computer-implemented method of claim 11, wherein the advisory signal is operative to report status information about the computer.

15. computer-implemented method for providing custom content that supplements static content displayed in an alert message for a software program module running on a local machine, comprising the steps of:

detecting one of a plurality of predetermined conditions;

displaying the alert message in response to the detected predetermined condition, the alert message comprising the static content and at least one control object;

responsive to selection of one of the control objects, accessing an information source that maintains the custom content, wherein the information source is located separately from the local machine; and displaying the custom content to present supplemental information that is related to the detected predetermined condition.

16. The computer-implemented method of claim 15 further comprising the step of reporting the detected predetermined condition, prior to generating the alert message, by supplying a unique identifier that identifies the detected predetermined condition.

17. The computer-implemented method of claim 16, wherein the step of reporting the detected predetermined condition further comprises supplying the static content for presentation by the alert message.

18. The computer-implemented method of claim 16 further comprising the step of determining whether to display the alert message with at least one control object by inquiring whether the custom content associated with the detected predetermined condition is maintained at the information source.

19. The computer-implemented method of claim 18, wherein the step of determining whether to display the alert message with at least one control object comprises:

conducting a search for a base parameter in a database, if the base parameter is located in the database, then determining whether a browser is available for operation by the local machine, if the browser is available for operation by the local machine, then displaying the alert message with at least one control object, wherein selection of the control object results in launching the browser and opening a hyperlink including the base parameter to view the custom content maintained at the information source;

otherwise, displaying the alert message with only the static content.

20. The computer-implemented method of claim 16 wherein the step of displaying the alert message further comprises;
  conducting a search for a value maintained in a database residing on the local machine and corresponding to the unique identifier,
  if the value is defined by a non-zero data string, then displaying the control object with content defined by the non-zero data string;
  otherwise, displaying the control object with content defined by default data.

21. The computer-implemented method of claim 15, wherein the step of accessing an information source that maintains the custom content comprises:
  obtaining an identifier that identifies the information source; and
  launching a browser; and
  using the browser to view the custom content maintained at the information source by opening a hyperlink including the identifier.

22. The computer-implemented method of claim 15, wherein the alert message comprises a dialog, the detected predetermined condition is identified by a unique identifier, and each control object comprises a button, and wherein displaying the alert message comprises the steps of:
  conducting a search for a value maintained in a registry of an operating system running on the local machine, the value corresponding to the unique identifier,
  if the value is defined by a non-zero data string, then displaying one of the buttons with content defined by the non-zero data string;
  otherwise, displaying one of the buttons with content defined by default data maintained by the software program module.

23. The computer-implemented method of claim 15, further comprising determining whether to display the alert message with at least one control object which comprises:
  using a dynamic linked library (DLL), shared by the software program module and maintained in memory on the local machine, to conduct a search for a base parameter in a predetermined location within a registry of an operating system running on the local machine, the base parameter providing at least a portion of an identifier for the information source;
  if the base parameter is located in the registry, then the DLL conducts an inquiry to determine whether a browser is available for operation by the local machine, otherwise, the DLL supports a display of the alert message with only the static content;
  if the browser is available for operation by the local machine, then the DLL supports a display of the alert message with at least one control object, otherwise, the DLL supports a display of the alert message with only the static content.

24. The computer-implemented method of claim 23, wherein the step of accessing an information source that maintains the custom content comprises:
  using the DLL to construct a uniform resource locator (URL) that identifies the information source, the URL comprising the base parameter and at least one supplemental parameter identifying the software program module;
  launching the browser by selecting one of the control objects of the alert message;
  using the browser to view the custom content maintained at the information source by opening a hyperlink defined by the URL to view the custom content maintained at the information source.

25. A computer-implemented method for providing custom content that supplements static content displayed in an alert message for a software program module running on a local machine, comprising the steps of:
  detecting one of a plurality of predetermined conditions;
  displaying the alert message in response to the detected predetermined condition;
  opening a hyperlink from the alert message to access an external information source that maintains the custom content, the external information source operating in a location separate from the local machine;
  displaying the custom content to present supplemental information that is related to the detected predetermined condition.

26. The computer-implemented method of claim 25 further comprising the step of reporting the detected predetermined condition, prior to generating the alert message, by supplying (1) a unique identifier that identifies the detected predetermined condition and (2) the static content for presentation by the alert message.

27. The computer-implemented method of claim 26 further comprising the step of determining whether to display the alert message by:
  conducting a search in a database for a base parameter providing at least a portion of the hyperlink for the external information source;
  if the base parameter is located in the database, then determining whether a browser is available for operation by the local machine, and
  if the browser is available for operation by the local machine, then displaying tie alert message with a control object operative to open the hyperlink in response to selection of the control object;
  otherwise, displaying the alert message with only the static content.

28. The computer-implemented method of claim 27 wherein the step of displaying the alert message further comprises;
  conducting a search for a value maintained in a database residing on the local machine and corresponding to the unique identifier,
  if the value is defined by a non-zero data string, then displaying the control object with content defined by the non-zero data string;
  otherwise, displaying the control object with content defined by default data.

29. The computer-implemented method of claim 25 further comprising the step of determining whether to display the alert message by:
  conducting a search in a database for a base parameter providing at least a portion of the hyperlink to the external information source;
  if the base parameter is located in the database, then determining whether a browser is available for operation by the local machine; and
  if the browser is available for operation by the local machine, then displaying the alert message with the hyperlink;
  otherwise, displaying the alert message with only the static content.

30. The computer-implemented method of claim 29, wherein the step of opening a hyperlink to access an external information source that maintains the custom content comprises:

obtaining a uniform resource locator (URL) that identifies the external information source, the URL defining at least a portion of the hyperlink; and launching a browser to view the custom content maintained at the external information source by opening the hyperlink including the URL.

31. The computer-implemented method of claim 30, wherein the step of obtaining a URL comprises constructing the URL by appending the base parameter to at least one supplemental parameter identifying the software program module.

32. A computer-implemented method for providing an alert message for a software program module runing on a local machine, comprising the steps of:

detecting one of a plurality of predetermined conditions; and displaying the alert message in response to the detected predetermined condition, the alert message comprising custom content to the detected predetermined condition, the custom content maintained in a database and accessible for modification.

33. The computer-implemented method of claim 32 further comprising the step of reporting the detected predetermined condition, prior to generating the alert message, by supplying (1) a unique identifier that identifies the detected predetermined condition and (2) static content for presentation by the alert message.

34. The computer-implemented method of claim 33 wherein the step of displaying the alert message further comprises:

using the unique identifier to conduct a search for the custom content maintained in the database residing on the local machine; and in the event that the custom content corresponding to the unique identifiers located, then displaying the alert message with the custom content corresponding to the unique identifier.

35. The computer-implemented method of claim 32 further comprising the step of sending an advisory signal to a data collection site operating in a location separate from the local machine, the advisory signal operative to report the occurrence of the detected predetermined condition at the local machine.

36. The computer-implemented method of claim 35, wherein the advisory signal is transmitted as a page message via a wireless communications system.

\* \* \* \* \*